United States Patent [19]

Sakai et al.

[11] 4,341,953
[45] Jul. 27, 1982

[54] FOCUS DETECTING SYSTEM

[75] Inventors: Shinji Sakai; Nobuhiko Shinoda; Takao Kinoshita, all of Tokyo; Takashi Kawabata, Kamakura; Nozomu Kitagishi, Kawasaki; Kazuya Hosoe, Machida; Tadashi Ito, Yokohama, all of Japan

[73] Assignee: Canon Kabushiki Kaisha, Tokyo, Japan

[21] Appl. No.: 151,533

[22] Filed: May 19, 1980

[30] Foreign Application Priority Data

May 23, 1979 [JP] Japan .................................. 54-63376

[51] Int. Cl.³ .............................................. G01J 1/20
[52] U.S. Cl. ..................................... 250/204; 250/201; 354/25
[58] Field of Search .................. 250/201, 204; 354/25; 356/4

[56] References Cited

U.S. PATENT DOCUMENTS 3,967,110  6/1976  Rogers et al. .................. 250/201

Primary Examiner—David C. Nelms
Assistant Examiner—Darwin R. Hostetter
Attorney, Agent, or Firm—Toren, McGeady & Stanger

[57] ABSTRACT

A focus detecting system for detecting focusing condition of an image forming optical system to an object. In this system there are produced first and second signals corresponding to imaging conditions of object images at first and second positions on front and rear sides of and at substantially equal distances from a predetermined focal plane of said optical system, respectively, and another signal corresponding to imaging condition of an object image at third position substantially coincident with said predetermined focal plane. In accordance with these first, second and third signals, a decision is given as to the focusing condition, namely, in-focus, near-focus or far-focus condition, as well as, the distinction between correctly focused condition and considerably defocused condition.

64 Claims, 21 Drawing Figures

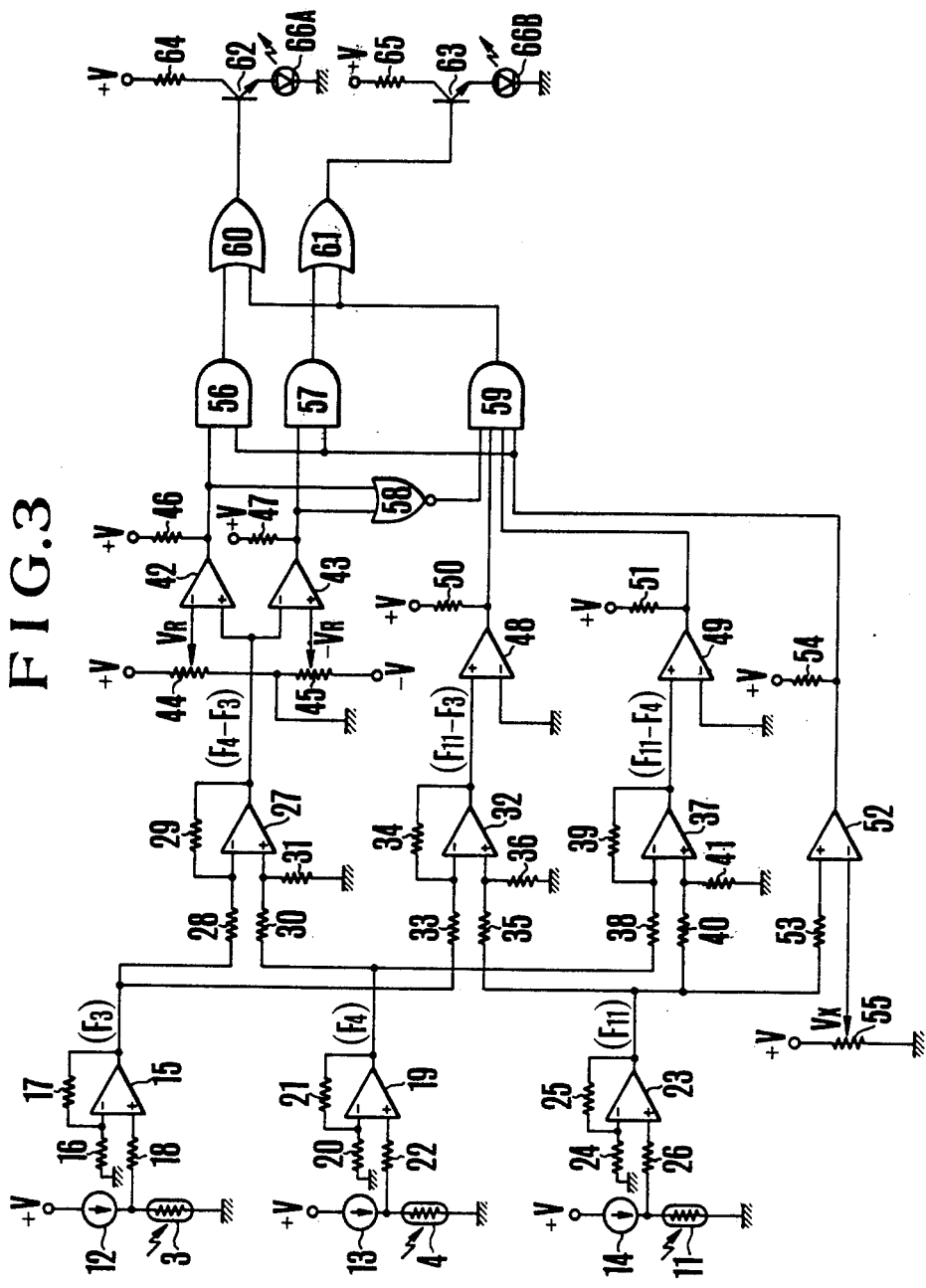

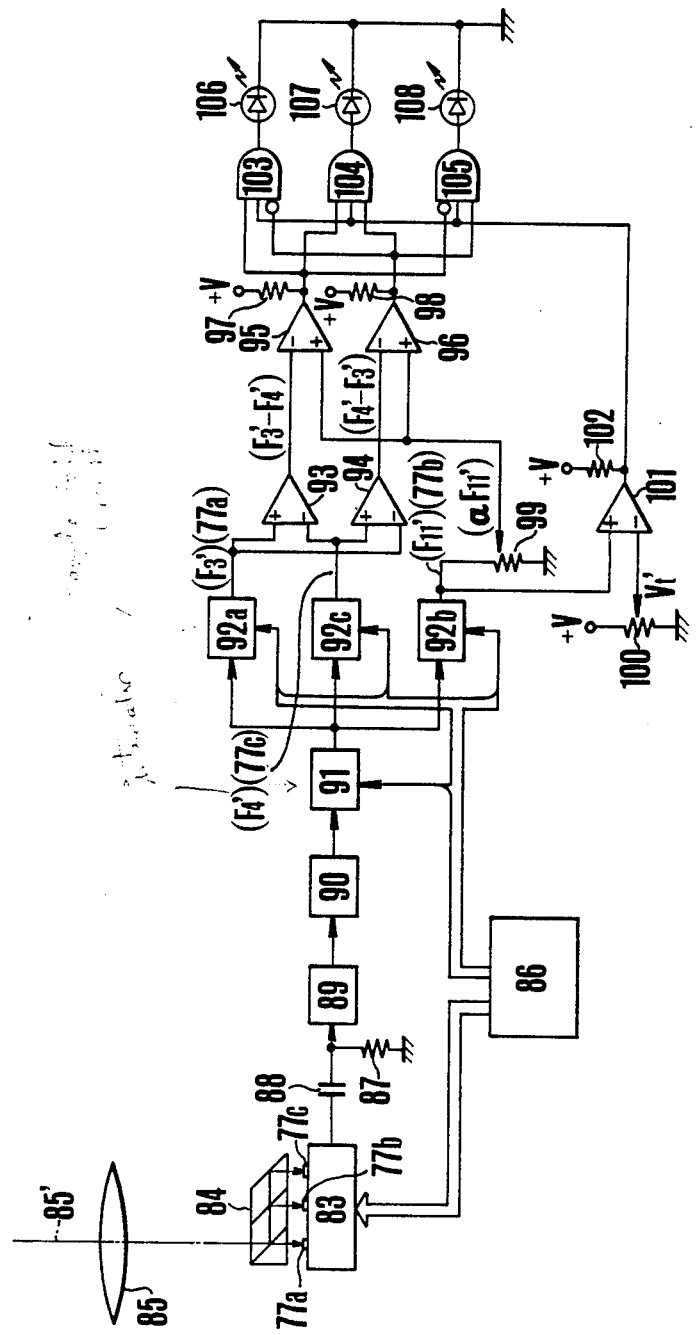

FOCUS DETECTING SYSTEM

BACKGROUND OF THE INVENTION

1. Field of the Invention

The present invention relates to a focus detecting system for detecting focusing condition of an image forming optical system to an object, and, more particularly, a focus detecting system of this kind in which there are produced two signals corresponding to imaging conditions of object images at two positions substantially on opposite sides, front and rear, of and at substantially equal distances from a predetermined focal plane of the image forming optical system to be focused onto the object. These signals are compared to detect the focusing condition of said optical system to the object, particularly, in-focus or defocus condition, together with the defocusing direction in case of said defocus condition, namely near-focus or far-focus.

2. Description of the Prior Art

Heretofore, there have been proposed many methods and devices for detecting in-focus condition of an image forming optical system by evaluating sharpness of an image formed by said optical system. In one of the focus detecting systems heretofore proposed, a photo-sensitive element having output characteristics varying in accordance with the variation of image sharpness are arranged at two positions on substantially opposite sides of and at substantially equal distances from a predetermined focal plane of said image forming optical system, and at the time of adjustment of said optical system the outputs of these two photo-sensitive elements are compared with each other to decide that said optical system is under an in-focus condition when said outputs become equal to each other. According to such system, it is possible to decide the focusing condition, namely in-focus or defocus condition, as well as the defocusing direction in the latter case, namely near-focus or far-focus condition. Particularly, such system is advantageous in the optical system provided with a servo mechanism to perform automatic focusing operation. In practice, however, a good imaging condition cannot be always assured in all cases, and, on the contrary, bad imaging condition may be produced in all cases. In the latter case, it may be impossible to obtain a correct decision on the in-focus condition and an erroneous focusing result may occur.

Particularly, such system has a fundamental defect in that it is very difficult to distinguish correctly focused condition from considerably defocused condition. That is, this system is constructed to detect the focusing condition by comparing the values of outputs of the above-mentioned photo-sensitive elements, and the outputs of both photo-sensitive elements become equal to each other when the optical system is correctly focused onto the object, while these outputs of both photo-sensitive elements also become equal or substantially equal in the case where the optical system is under a considerably defocused condition.

SUMMARY OF THE INVENTION

In view of the background described above, applicants have invented an improved focusing system as hereinafter described in detail.

The present invention is directed to a focus detecting system of the type in which there are produced two signals corresponding to imaging conditions of object images at two positions located on substantially opposite sides, front and rear, of and at substantially equal distances from a predetermined focal plane of an image forming optical system to be focused on an object and these two signals are compared with each other to detect the focusing condition of said optical system; and it is a principal object of the present invention to provide an improved and advantageous focus detecting system in which the fundamental defect inherent in this type of focus detecting system, namely great difficulty in distinguishing correctly focused condition from considerably defocused condition, is surely removed by very simple means, so that a correct decision on the focusing condition can be assured.

With this object, in accordance with the present invention there is proposed an advantageous form of focus detecting system in which first and second signals corresponding to imaging conditions of object images at first and second positions located on substantially opposite sides of and at substantially equal distances from a predetermined focal plane of an image forming optical system, together with a third signal corresponding to imaging condition of the object image at a third position substantially coincident with said predetermined focal plane are formed, and in accordance with these first, second and third signals a decision is provided as to the focusing condition of said optical system relative to the object, namely in-focus, near-focus or far-focus condition, as well as the distinction between correctly focused condition and considerably defocused condition.

It is another object of the present invention to provide an advantageous method for easily and surely providing a decision on the focusing condition of the above-mentioned image forming optical system to the object, namely in-focus, near-focus or far-focus condition, as well as a decision on the distinction between the a correctly focused condition and the considerably defocused condition, in order to attain the above-mentioned principal object.

Firstly, as one of methods for easily and surely providing a decision on the distinction between the considerably defocused condition and the opposite condition, with the object as described above, the preferred embodiment of the present invention as hereinafter described discloses a method for decision in which, assuming that $f_3$ represents said third signal, the case where $f_3 < f_{c1}$ (or $f_3 \leq f_{c1}$, where $f_{c1}$ is a predetermined standard level) is regarded as the considerably defocused condition and the case where $f_3 \geq f_{c1}$ (or $f_3 < f_{c1}$) is regarded as the opposite condition.

Furthermore, as a method for easily and surely providing a decision on the focusing condition, namely in-focus, near-focus or far-focus condition, the above-mentioned embodiment discloses a method for decision in which, assuming that $f_1$ and $f_2$ represent said first and second signals, respectively, the case where $|f_1-f_2| < f_{c2}$ (or $|f_1-f_2| < f_{c2}$, where $f_{c2}$ is a predetermined standard level) or $|f_1-f_2| \leq kf_3$ (or $|f_1-f_2| < kf_3$, where $k$ is a constant smaller than 1) and $f_3 \geq f_{c1}$ (or $f_3 > f_{c1}$), for example, and the case where in addition to the above, the conditions of $f_3 \geq f_1$ and $f_3 \geq f_2$ (or $f_3 > f_1$ and $f_3 > f_2$) are fulfilled are regarded as in-focus conditions; the case where $(f_1-f_2) > f_{c2}$ (or $f_1-f_2) \geq f_{c2}$) or $(f_1-f_2) > kf_3$ (or $(f_1-f_2) \geq kf_3$) and $f_3 \geq f_{c1}$ (or $f_3 > f_{c1}$) is regarded as near-focus condition; and the case where $(f_1-f_2) < -f_{c2}$ (or $(f_1-f_2) \leq -f_{c2}$) or $(f_1-f_2) < -kf_3$ (or $(f_1-f_2) \leq -kf_3$) and $f_3 \geq f_{c1}$ (or $f_3 > f_{c1}$) is regarded as far-focus condition.

Thus, the present invention provides a focus detecting system in which the decision is given on the focusing condition of an image forming optical system to an object, namely in-focus, near-focus or far-focus condition, as well as on the distinction between a correctly focused condition and considerably defocused condition, whereby the disadvantage in the conventional system is completely obviated.

The focus detecting system according to the present invention is suitable for use in a single-lens reflex camera, for example. It is well known that, in a single-lens reflex camera, a plurality of photographing optical systems having different focal lengths can be interchangeably used, and a photographing optical system having a very long focal length (e.g. telephoto lens), when used, causes remarkable displacement of point of focus, so that the considerably defocused condition is apt to happen. The system according to the present invention is effectively used in such case.

The above and other objects and characteristic features of the present invention will be clearly understood from the explanation which will be described with reference to the accompanying drawings.

BRIEF DESCRIPTION OF THE DRAWINGS

In the drawings:

FIG. 3 is a circuit diagram showing the first embodiment of the focus detecting system according to the present invention;

DETAILED DESCRIPTION OF THE PREFERRED EMBODIMENTS

Before describing the embodiments of the present invention, the description will be given to the conventional focus detecting system to which the improvement according to the present invention is to be applied, with reference to FIGS. 1A–1C.

Figure 1A:
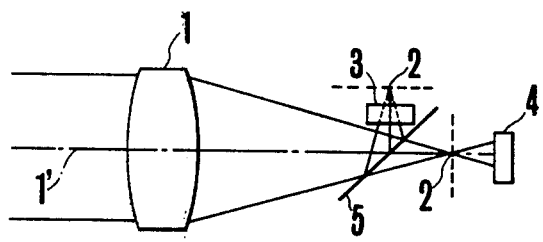
FIGS. 1A, 1B and 1C illustrate a fundamental optical arrangement of the conventional focus detecting system to which the improvement according to the present invention is to be applied, a photoelectric signal produced in said system, and an example of construction of a most simple circuit therefor.

Referring to FIG. 1A, 1 is an image forming lens (i.e. photographing lens, in the case of a camera), 2 is a predetermined focal plane (i.e. film plane, in case of camera), and 3 and 4 are photo-sensitive elements such as CdS, CdSe or the like, each of which having such property that its internal resistance increases as the sharpness of an image formed on the light receiving plane thereof is increased. These photo-sensitive elements 3 and 4 are arranged in such relationship that the respective elements receive incident light flux which is transmitted through the lens 1 and divided by a beam splitter 5 which has a reflection-transmission ratio of 1:1, and their light receiving planes are arranged in such relationship that the light receiving plane of the element 3 is positioned on the front side of said predetermined focal plane 2 at a predetermined distance therefrom, while the light receiving plane of the element 4 is positioned on the rear side of said plane 2 at the same distance therefrom.

Figure 1B:
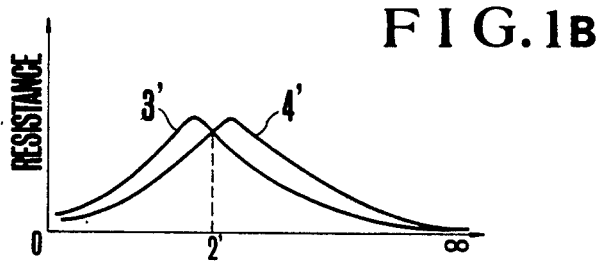

In such optical arrangement, if the image forming lens 1 is adjusted along its optical axis relatively to an object located at a finite distance therefrom, the photo-sensitive elements 3 and 4 are subjected to variation of their internal resistance as shown in FIG. 1B. In FIG. 1B, the position of adjustment of said lens 1 is indicated on its abscissa while the internal resistance of the photo-sensitive elements 3 and 4 are indicated on its ordinate, in optional units, and the curves 3' and 4' indicate the values of internal resistance of the photo-sensitive elements 3 and 4, respectively.

It will be understood from FIG. 1B that the values of internal resistance of the elements 3 and 4 become equal to each other when the image forming position coincides with the predetermined focal plane 2 shown in FIG. 1A. This point is shown by 2' on the abscissa in FIG. 1B. As the image forming position is shifted forward or backward of the predetermined focal plane 2, the internal resistance value of the photo-sensitive element corresponding thereto is increased while the internal resistance value of the other photo-sensitive element is decreased. If the image forming position is extremely shifted from said predetermined focal plane 2, the sharpness of the images formed on the light receiving planes of both elements 3 and 4 is extremely lowered, so that the internal resistance values of both elements 3 and 4 are remarkably decreased. It will be seen from FIG. 1B that it is possible to detect the positional relationship of the image forming position relative to the predetermined focal plane 2, by comparing the values of the internal resistances of the photo-sensitive elements 3 and 4.

Figure 1C:
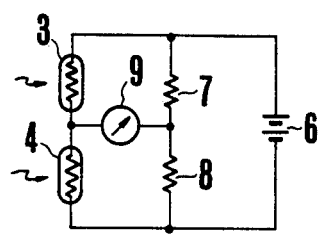

FIG. 1C shows an example of construction for effecting such detection in a simple manner and indicating the result of the detection by an indicating means. In the construction shown in FIG. 1C, power is supplied from a battery 6 to the photo-sensitive elements 3 and 4, and these elements together with resistors 7 and 8 constitute a well-known bridge circuit, which includes a meter 9 arranged in the cross position thereof. As explained in FIG. 1B, the internal resistance values of the photo-sensitive elements 3 and 4 vary in accordance with the adjustment of the image forming lens 1, so that electric current flows through the meter 9, resulting in deflection of the pointer thereof. If the circuit is so adjusted that the pointer of the meter comes to its zero position under the in-focus condition of the image forming lens 1, the pointer moves to one side or the other depending upon the near-focus or far-focus condition, and thus it is possible to see the focusing condition of the image forming lens 1 by the deflection of the pointer. In such conventional system, however, the pointer of the meter also comes to the zero position when the image forming plane of the image forming lens 1 is extremely shifted from the predetermined focal plane 2, as is easily understood from FIG. 1B, and consequently it is impossible to distinguish such extremely shifted condition from the true in-focus condition where the image forming plane correctly coincides with the predetermined focal plane 2, resulting in erroneous operation.

Figure 2A:
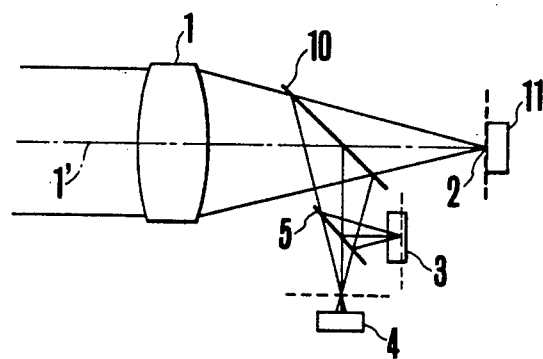
FIGS. 2A and 2B illustrate a fundamental optical arrangement of the focus detecting system according to the present invention and a photoelectric signal produced in said system.
Figure 10:
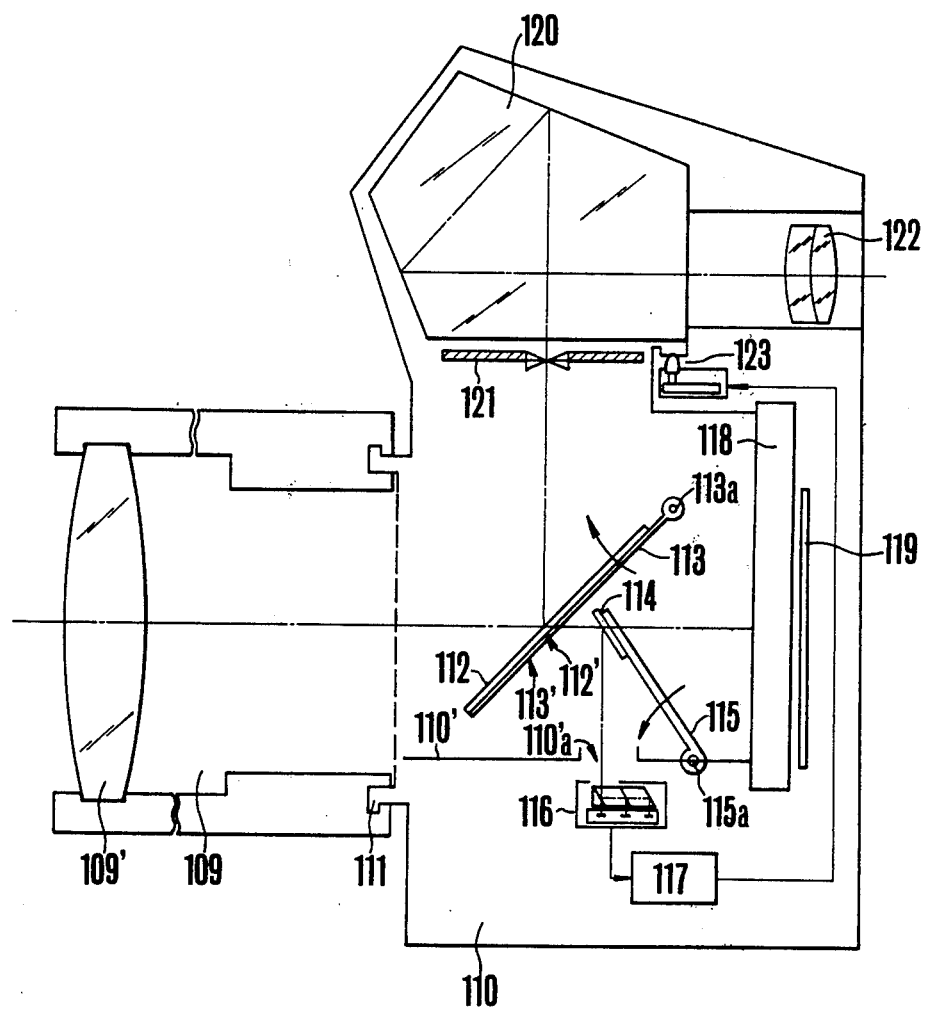
FIG. 10 is a schematic view illustrating an example of construction of a single-lens reflex camera in which the embodiment shown in FIG. 3 or FIG. 7 (including a modified form shown in FIG. 9A) is included.

Now, the description will be given to the principle of the focus detection of the system according to the present invention, in which the above-mentioned disadvantage of the conventional system can be obviated, with reference to FIGS. 2A and 2B. In FIG. 2A, the elements which are shown by same symbols as those in FIG. 1A indicate the parts which are identical with those in FIG. 1A in construction and effect, and therefore the detailed description thereof is omitted. Referring to FIG. 2A, 10 indicates a half-mirror which serves to divide the incident light flux coming from the image forming lens 1, and two photo-sensitive elements 3 and 4 and a half-mirror 5 are arranged in the path of light flux reflected from said half-mirror 10 in the positional relationship as described with reference to FIG. 1A. 11 is a third photo-sensitive element which receives the light flux transmitted through the half-mirror 10, and the light receiving plane thereof is arranged to coincide with the predetermined focal plane 2 of the image forming lens 1. This third element 11 has same property as those of the elements 3 and 4. If illuminance of images formed on the light receiving planes of these three photo-sensitive elements 3, 4 and 11 are to be equal to each other, it is necessary that the reflection-transmission ratio of the half-mirror 10 should be 2:1 and the reflection-transmission ratio of the half-mirror 5 should be 1:1.

Figure 2B:
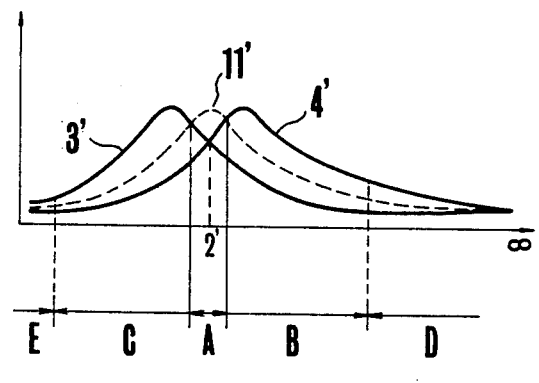

The relationship between the variation of internal resistance values of three photo-sensitive elements 3, 4 and 11 in the optical arrangement as described above and the adjustment of the image forming lens 1 relative to an object located at a finite distance therefrom is shown in FIG. 2B, in which curve 11' indicates the variation of the internal resistance value of the third photo-sensitive element 11. It will be clear from FIG. 2B that when the image forming plane of the lens 1 is located in the region indicated by A, that is, said plane is located near the predetermined focal plane 2, the internal resistance value of the third photo-sensitive element 11 is higher than those of the elements 3 and 4, and such relationship does not exist in the area other than the region A.

By utilizing such relationship, the in-focus condition can be easily distinguished from the extremely defocused condition.

Now the embodiments of the system according to the present invention based upon such principle of focus detection will be described.

Firstly, a description will be made of FIG. 3 which illustrates the first embodiment of the present invention, particularly the construction of the electric circuit of the first embodiment, which is based upon the principle of optical arrangement shown in FIG. 2A.

Referring to FIG. 3, three photo-sensitive elements 3, 4 and 11 shown in FIG. 2A are connected with constant current source 12, 13 and 14, respectively, so that constant current flows in each of these elements. The variation of voltages due to change of the resistance values of the photo-sensitive elements 3, 4 and 11 are fed through resistors 18, 22 and 26 to non-inverting inputs of the operational amplifiers 15, 19 and 23, respectively. Elements 16, 17; 20, 21; and 24, 25 indicate input resistors and feedback resistors, respectively, of the respective amplifiers 15, 19 and 23, and the arrangement of connection thus formed produces voltages corresponding to the change of resistance values of the respective photo-sensitive elements 3, 4 and 11 (hereinafter referred to as "focus signals") at the respective output terminals of the respective amplifiers 15, 19 and 23. An operational amplifier 27 together with resistors 28, 29, 30 and 31 constitutes a differential amplifier, to which the outputs of the amplifiers 15 and 19 are fed, so that a signal corresponding to the difference between the focus signal levels fed from the amplifiers 15 and 19 is produced at the output terminal of the operational amplifier 27. In the same manner, an operational amplifier 32 together with resistors 33, 34, 35 and 36 constitutes a differential amplifier, to which the outputs of the amplifiers 15 and 23 are fed, so that a signal corresponding to the difference between the focus signal levels fed from the amplifiers 15 and 23 is produced at the output of the operational amplifier 32. Further, an operational amplifier 37 together with resistors 38, 39, 40 and 41 constitutes a differential amplifier, to which the outputs of the amplifiers 19 and 23 are fed, so that a signal corresponding to the difference between the focus signal levels fed from the amplifiers 19 and 23 is produced at the output of the operational amplifier 37. Comparators 42 and 43 constitute window comparators for comparing the output levels of the operational amplifier 27 with predetermined levels $V_R$ and $-V_R$ set by variable resistors 44 and 45, respectively. They are so connected in the circuit that when the output level of the operational amplifier 27 is higher than $V_R$, the output of the comparator 42 becomes high and the output of the comparator 43 becomes low; when the output level of the amplifier 27 is lower than $-V_R$, the output of the comparator 42 becomes low and the output of the comparator 43 becomes high; and when the output level of the amplifier 27 is higher than $-V_R$ and lower than $V_R$, the outputs of both comparators 42 and 43 become low, as shown in FIG. 3.

A comparator 48, which has an inverting input terminal connected to ground, constitutes a zero-detector. This comparator is so connected in the circuit than its output becomes high only when the output of the operational amplifier 32 is positive, namely, the focus signal level fed from the operational amplifier 23 is higher than that fed from the operational amplifier 15, as shown in FIG. 3. A comparator 49, which has an inverting input terminal connected to ground, constitutes a zero-detector for the output of the operational amplifier 37. This comparator is so connected that its output becomes high only when the output of the operational amplifier 37 is positive, that is, when the focus signal level fed from the operational amplifier 23 is higher than that fed from the operational amplifier 19. A comparator 52 compares the focus signal level fed from the operational amplifier 23 through a resistor 53 with the standard level Vt set by a variable resistor 55. This comparator is so connected that its output becomes high only when the focus signal level fed from the operational amplifier 23 is higher than the predetermined level Vt set by a variable resistor 55. Resistors 46, 47, 50, 51 and 54 which serve to adjust the voltage levels of low-level outputs of the comparators 42, 43, 48, 49 and 52, respectively, are connected to the output terminals of the comparators 42, 43, 48, 49 and 52, respectively, and voltage of +V is applied to each of these resistors. Elements 56, 57 and 59 indicate AND gates and 58 indicates NOR gate. Assuming that F3, F4 and F11 represent focus signals fed from the operational amplifiers 15, 19 and 23, respectively, the circuit arrangement as shown in FIG. 3 is such that the output of the AND gate 56 is high only when F11>Vt and F4-F3>$V_R$, the output of the AND gate 57 is high only when F11>Vt and F4-F3<$-V_R$, the output of the NOR gate 58 is high only when $-V_R \leq F4-F3 \leq V_R$, and the output of the AND gate 59 is high only when F11>Vt, F11>F3, F11>F4 and $-V_R \leq F4-F3 \leq V_R$.

Elements 60 and 61 designate OR gates. The OR gate 60 provides an output which becomes high only when the output of the AND gate 56 is high or the output of the AND gate 59 is high, and such output acts to turn on a display circuit constructed of a transistor 62, a resistor 64 and an LED (light emissive diode) 66A, thereby lighting the LED 66A. The OR gate 61 acts to turn on a display circuit constructed of a transistor 63, a resistor 65 and an LED (light emissive diode) 66B only when the output of the AND gate 57 is high or the output of the AND gate 59 is high, thereby lighting the LED 66B.

In such construction of the focus detecting system, it is firstly assumed that the predetermined levels $V_R$, $-V_R$ and Vt are so selected that F11>Vt, F11>F3, F11>F4 and $-V_R \leq F4-F3 \leq V_R$ under the correct in-focus condition indicated by the region A in FIG. 2B. In the region A, the outputs of the comparators 48, 49 and 52 are high while the outputs of the comparators 42 and 43 are low, and consequently the output of the AND gate 59 is high. In this condition, both LEDs 66A and 66B are turned on, thereby displaying that the system is under an in-focus condition. Next, it is assumed that the system is under the region indicated by B, that is, under the somewhat defocused condition on the far-focus side. Then, F11>Vt and F4-F3>$V_R$, that is, the outputs of the comparators 42 and 52 are high, while the output of the comparator 43 is low. Consequently, only the output of the AND gate 56 is high, so that the output of the OR gate 60 is high. Then, only the LED 66A is turned on, thereby displaying that the system is under defocused condition on the far-focus side. Conversely, it is assumed that the system is under the defocused condition as indicated by the region C. In such region, the defocusing degree is of the same order as that described above but the defocusing direction is in opposite to that of the latter (the system is under near-focus condition). In such case, F11>Vt and F4-F3<$-V_R$, that is, the outputs of the comparators 43 and 52 are high while the output of the comparator 42 is low. Consequently, only the output of the AND gate 57 is high and the output of the OR gate 61 is high, so that only the LED 66B is turned on, thereby displaying that the system is under defocused condition on the near-focus condition. Lastly, in the regions indicated by D and E, the system is under the extremely defocused condition, that is, the output of the comparator 52 is low, so that all outputs of the AND gates 56, 57 and 59 are low. In such a case, no LED is turned on.

It will be understood that in the system according to the embodiment shown in FIG. 3, not only the discrimination between the conditions of in-focus, near-focus and far-focus conditions but also the discrimination between the correctly focused condition and the extremely defocused condition can be made, and thus the disadvantage in the conventional system as described above with reference to FIGS. 1A-1C is completely removed.

Now explanation will be made concerning some examples of the optical arrangement of the light receiving system for focus detection which can be adapted to the system according to the present invention.

Figure 4D:
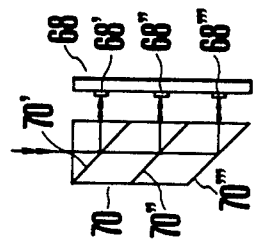
FIGS. 4A, 4B, 4C, 4D and 4E illustrate examples of an optical arrangement of a light receiving system for focus detection adaptable to the focus detecting system according to the present invention.
Figure 4E:
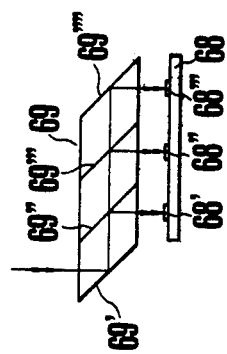
Figure 4C:
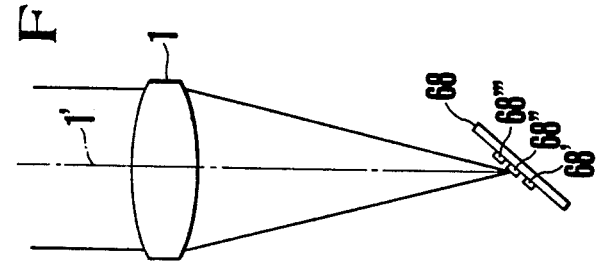
Figure 4A:
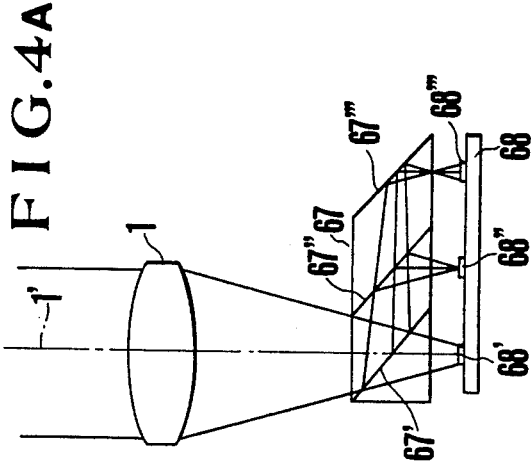
Figure 4B:
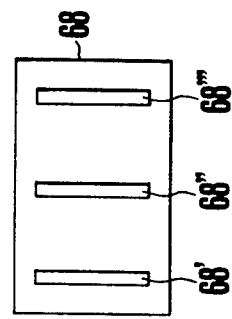

The light receiving system for focus detection of the focus detecting system according to the present invention can be, of course, realized by using photo-sensitive elements 3, 4 and 11, which are independent from one another, and two half-mirrors 5 and 10, but this optical arrangement has such disadvantage that it is very difficult to make adjustment to correctly set the positional relationship between the respective constituent elements. The examples which will be described with reference to FIGS. 4A-4E show the construction in which the correct setting of the optical relationship as described above can be obtained, with a satisfactory accuracy, only by fixing the photo-sensitive elements and the elements of optical system for dividing light flux, provided that good accuracy of the arrangement of the photo-sensitive elements on the base plate and good accuracy of the elements of optical system for dividing light flux are assured. Firstly, FIG. 4A shows an example of the construction in which three photo-sensitive elements 68′, 68″ and 68‴ are arranged on a base plate 68 of ceramic material or the like, as shown in FIG. 4B, and a beam splitter 67 is arranged thereon. The beam splitter 67 includes a half transmitting part 67′ having reflection-transmission ratio of 2:1, for example, a half transmitting part 67″ having reflection-transmission ratio of 1:1, for example, and a wholly reflecting part 67‴. The image forming light flux coming from the lens 1 is divided, by means of the beam splitter 67, into three portions which have different optical paths, with the result that the respective light receiving parts 68′, 68″ and 68‴ on the base plate 68 are so arranged as to meet with the desired optical positional relationship as shown in FIG. 2A. FIG. 4C shows an example of the construction in which the light receiving parts 68′, 68″ and 68‴ are arranged in closely spaced relation on the base plate 68 which is disposed at an angle to the optical axis 1′ of the image forming lens 1, so that the light fluxes of image received by the respective light receiving parts 68′, 68″ and 68‴ have different optical paths. In FIG. 4C, the light receiving part 68″ is arranged to coincide with the predetermined focal plane of the lens 1. In the construction of FIG. 4C, it is not necessary to provide the beam splitter 67. FIGS. 4D and 4E illustrate modified forms of the beam splitter. The beam splitter 69 shown in FIG. 4D includes totally reflecting faces 69′ and 69″″ and half-mirror faces 69″ and 69‴. The beam splitter 70 shown in FIG. 4E includes half-mirror faces 70′ and 70″ and a totally reflecting face 70‴, and this is an example of the construction in which the beam splitter 70 and the base plate 68 can be arranged in parallel with the optical axis 1' of the lens 1. In the construction as described above, the light receiving parts 68', 68" and 68''' and the photo-sensitive elements 3, 4 and 11 shown in FIG. 2A are so related that the part 68' corresponds to the element 3, the part 68" corresponds to the element 11 and the part 68''' corresponds to the element 4. Although the base plate 68 has been described as made of ceramic material, the above construction can be, of course, applied to the structure where the base plate is made of a silicon wafer on or in which the light receiving parts are formed in monolithic form. Particularly a solidstate-imager, which has made great progress in recent years, can be very advantageously applied to this construction. The construction in which a solid-state-imager is used as a photo-sensitive element will be hereinafter described.

Figure 5:
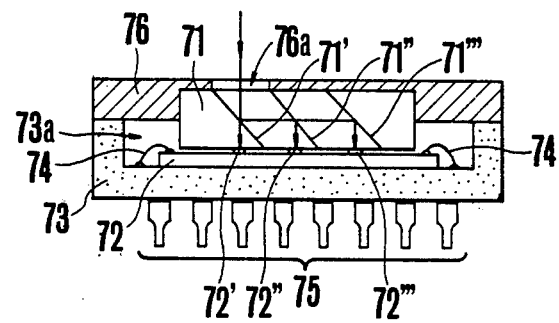
FIG. 5 illustrates an example of a light receiving unit for focus detection including a beam splitter and a photo-sensitive element united together to form one body, which is adaptable to the focus detecting system according to the present invention.

FIG. 5 shows an example of construction in which light receiving parts of CdS or the like formed on a ceramic base plate or light receiving parts of monolithic silicon formed on a silicon base plate together with a beam splitter are integrally sealed in a casing to constitute a module. A beam splitter 71 includes half-mirror faces 71' and 71" and a totally reflecting face 71''', in the same manner as in the beam splitter 67 shown in FIG. 4A, and a base plate 72 includes light receiving parts 72', 72" and 72'''. This base plate 72 is fixed on the bottom of a recessed portion 73a formed in an opaque casing 73. Leads 74 for connecting the light receiving parts 72', 72" and 72''' with outside circuits are connected through electrodes (not shown) formed in the casing 73 to terminals 75. Of course, the base plate 72 may be integrated with the light receiving parts 72', 72" and 72''', as well as the main parts of the circuit shown in FIG. 3, for example, or the circuit parts hereinafter described, to constitute a 1-chip IC module. An opaque cover member 76 having an opening 76a for passing light flux is fixed onto the casing 73 to hold the beam splitter 71.

Figure 6:
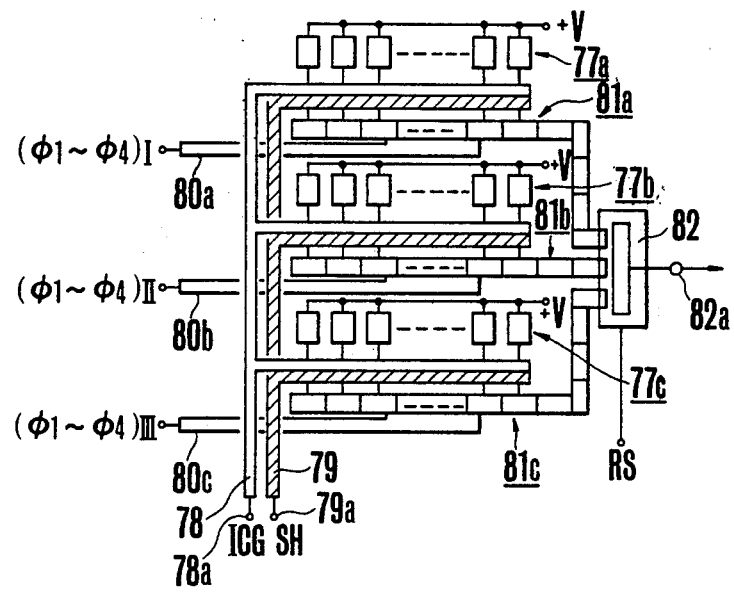
FIG. 6 illustrates an example of solid-state-imager adaptable to the focus detecting system according to the present invention.

FIG. 6 shows an example of the construction in which the light receiving means for focus detection is formed of a solid-state-imager, particularly an element of charge-transfer type. In this connection, it should be noted that the system according to the present invention is not limited to the use of such solid-state-imager of chargetransfer type, but it may be applied to other types, such as an MOS type image sensor or the like. Referring to FIG. 6, a plurality of micro photo-sensitive elements (sensor elements) 77a, 77b and 77c constitute three light receiving parts having well-known charge-integrating performance. These elements are spaced at suitable distances from each other and arranged, together with other elements which will be hereinafter described, on one silicon chip (semiconductor chip, not shown) in monolithic structure. Each of the photo-sensitive elements included in the light receiving parts 77a, 77b and 77c has a size of the order of $30\mu \times 50\mu$, for example. The photo-sensitive elements included in the light receiving parts 77a, 77b and 77c are not limited in number but preferably the same number, such as 100 to 200, of elements are included in the respective light receiving parts. Voltage shown as $+V$ in the drawing is applied to each of the photo-sensitive elements. An integration clear gate 78 is arranged to remove needless charge integrated in the respective photo-sensitive elements, before signal charge is to be integrated and an integration clear pulse indicated by ICG in FIG. 6 is applied to a terminal 78a of the gate in order to attain such performance. The integration clear gate 78 is held in an open state for a predetermined period, and when the needless charge integrated in the respective photo-sensitive elements has been completely removed, the gate 78 is closed again and the integration of the signal charge at the photo-sensitive elements starts. A charge transfer gate 79 is arranged to transfer the integrated charge after the signal charge has been integrated at each of the photo-sensitive elements for a predetermined period, and said gate serves to transfer the integrated charges, in successive manner for the respective ones of the light receiving parts 77a, 77b and 77c, to the charge transfer portions in the form of analog shift registers such as CCD 81a, 81b and 81c, respectively, which are operated by applying a shift pulse SH to a terminal 79a thereof. The signal charges of the respective photo-sensitive elements transferred to the analog shift registers 81a, 81b and 81c are successively transferred to the right, as viewed in FIG. 6, through said analog shift registers 81a, 81b and 81c by applying charge transferring pulses, for example 4-phase pulse train $[\phi_1-\phi_4]$ through electrodes indicated by 80a, 80b and 80c to said analog shift registers 81a, 81b and 81c. In the example as shown in FIG. 6, firstly the shift register 81a is actuated by applying the pulse train $[\phi_1-\phi_4]$ to the electrode 80a, for example, whereby the signal charge in said register 81a is transferred to the output portion 82, where the signal charge is converted into a voltage which is fed through its output terminal 82a in the form of time-seriating image signals, and then the register 81b and the register 81c are sequentially actuated. By controlling the registers in such manner, the signal charges integrated at the respective light receiving parts 77a, 77b and 77c are successively converted at the output portion 82 into voltages which are fed through the output terminal 82a. Thus, the image signals from the light receiving parts 77a, 77b and 77c are successively fed through the output terminal 82a. Reset pulse RS is applied to the output part 82 in synchronized relation to the transfer of 1 element of the signal charges at the analog shift registers 81a, 81b and 81c, in order to clear a charge-voltage converting capacitor (not shown) at the output portion 82 at every element. Then the integration clear gate 78 is opened and, after a predetermined period, closed again, whereby the integration of the signal charges at the respective photo-sensitive elements starts again. After a predetermined integration period, the charge transferring gate 79 is opened and the charges stored in the respective photo-sensitive elements up to that time are shifted, in successive manner for the respective ones of the light receiving parts 77a, 77b and 77c, to the analog shift registers 81a, 81b and 81c, whereby the charges are transferred. By repeating such operation cycle, the image signals from the respective photo-sensitive elements are cyclically fed through the output terminal 82a in a predetermined sequence.

FIG. 7 shows an embodiment of the focus detecting system according to the present invention in which the solid-state-imager as shown in FIG. 6, for example, is used as the light receiving means for focus detection. The system shown in FIG. 7 includes an image forming lens 85, a beam splitter 84 which is similar to the beam splitter 67 shown in FIG. 4A, and a solid-state-imager 83 which is the same as that shown in FIG. 6 but is shown in simplified form. The output of the solid-state-imager 83, that is, the image signal of three images, is passed through a high-pass filter consisting of a capacitor 88 and resistor 87, whereby the relatively high frequency thereof is extracted and then converted to an absolute value by means of an absolutizing circuit 89. An emphasizer circuit 90 is connected with the absolutizing circuit 89 to emphasize the output of said absolutizing circuit 89 in accordance with the level thereof, and the output level of said absolutizing circuit 89, which becomes higher as the sharpness of image is increased, is further emphasized by the emphasizer circuit, while the signal having low level owing to decrease of sharpness is suppressed thereby. Accordingly, the output level of the emphasizer circuit 90 sensitively reflects the sharpness of an image. It may be most easy method for obtaining such emphasizing effect to utilize the non-linear characteristic of a circuit. An integrating circuit 91 is arranged next to the emphasizer circuit 90, and said circuit 91 is controlled by a control circuit 86 to integrate the output of the emphasizer circuit 90 corresponding to the signals fed from the respective light receiving parts 77a, 77b and 77c shown in FIG. 6, in individual and successive manner for the respective ones of the light receiving parts 77a, 77b and 77c. Accordingly the integrating circuir 91 serves to successively feed three focus signals corresponding to the focus conditions of the respective images on said three light receiving parts 77a, 77b and 77c. The focus signals corresponding to the focus conditions of the respective images on the above-mentioned three light receiving parts 77a, 77b and 77c fed from the integrating circuit 91 are held, until the next cycle, by sample-hold circuits 92a, 92b and 92c, in successive manner for the respective ones of the light receiving parts. The sample-hold circuits 92a, 92b and 92c are controlled by the control circuit 86 to individually sample and hold the focus signals corresponding to the light receiving parts 77a, 77b and 77c, respectively. Thus, the variations of the outputs of the respective sample-hold circuits 92a, 92b and 93c when the image forming lens 85 is adjusted along the optical axis 85' are the same as those shown by the curves 3', 11' and 4' in FIG. 2B, respectively. Now, for simplification of explanation, it is assumed that the output of the sample-hold circuit 92a corresponds to the curve 3' in FIG. 2B, which is defined as F'3, the output of the circuit 92b corresponds to that defined by F'11 and the output of the circuit 92c corresponds to that defined by F'4. The control circuit 86 serves to control the solid-state-imager 83, the integrating circuit 91 and the respective ones of the sample-hold circuits 92a–92c in a predetermined timing, and it serves to feed the respective pulses of ICG, SH, RS and $\phi_1$–$\phi_4$ to the solid-state-imager 83, for example, feed integration command signal and integration reset signal to the integrating circuit 91, and feed sampling pulse to the sample-hold circuits 92a–92c. The timing of these pulses is predetermined, and the integration clearance of needless charge at the solid-state-imager 83, the integration and transfer of the signal charge, the integration of signal at the integrating circuit 91, and the sampling and holding of focus signal by the sample-hold circuits 92a–92c are effected in a predetermined sequence. Differential amplifiers 93 and 94 are arranged to produce F'3–F'4 and F'4–F'3, respectively, in accordance with the outputs F'3 and F'4 of the sample-hold circuits 92a and 92c, and a variable resistor 99 is arranged to divide the output F'11 of the sample-hold circuit 92b, the output at the voltage dividing point being $\alpha$F'11 ($\alpha$<1). A comparator 101 is arranged to compare the predetermined voltage set by the variable resistor 100 with the output level F'11 of the sample-hold circuit 92b. A resistor 102 is connected to the output end of the comparator 101 in order to adjust the level of the low level output of the comparator 101, and the voltage +V is applied to this resistor. The predetermined voltage set by the variable resistor 100 is the same as the predetermined level Vt set by the variable resistor 55 in the embodiment shown in FIG. 3, it serves to suppress the display at the time when the output level F'11 of the sample-hold circuit 92b is extremely low, that is, the system is under extremely defocused condition. Accordingly, in view of the system shown in FIG. 3, this predetermined voltage set by the variable resistor 100 will be referred to as V't. The output of the comparator 101 is high when F'11<V't, while it is low when F'11<V't, that is, under extremely defocused condition. A comparator 95 is arranged to compare the output (F'3–F'3) of the differential amplifier 93 with $\alpha$F'11, and a comparator 96 is arranged to compare the output (F'4–F'3) of the differential amplifier 94 with $\alpha$F'11. The comparators are so arranged that the output of the comparator 95 is low when F'7–F'4>$\alpha$F'11 and high when F'3–F'4≦$\alpha$F'11, while the output of the comparator 96 is low when F'4–F'3>$\alpha$F'11 and high when F'4–F'3≦$\alpha$F'11, as shown in the drawing. Resistors 97 and 98 are arranged to adjust the levels of the low level outputs of the comparators 95 and 96, respectively, and they are connected to the output ends of the comparators 95 and 96, respectively, to each of which the voltage +V is applied. The voltage dividing factor $\alpha$ of said variable resistor 99 determines the scope which is regarded as the in-focus condition, and it is variable in this embodiment. The circuit includes AND gates 103, 104 and 105. The AND gate 103 is so arranged that its output is high only when the outputs of the comparators 95 and 101 are high while the output of the comparator 96 is low. The AND gate 104 is so arranged that its output is high only when all of the outputs of the comparators 95, 96 and 101 are high. The AND gate 105 is so arranged that its output is high only when the outputs of the comparators 96 and 101 are high while the output of the comparator 95 is low. Display LEDs 106, 107 and 108 are connected to the output ends of the AND gates 103, 104 and 105, respectively.

Figure 8A:
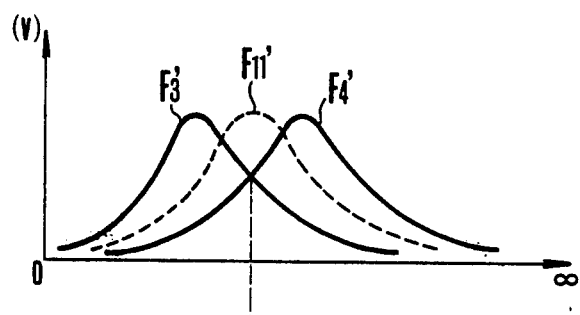
FIGS. 8A and 8B illustrate an output wave form of an essential circuit in the embodiment shown in FIG. 7 and a principle of decision of the focus detecting condition effected thereby.
Figure 8B:
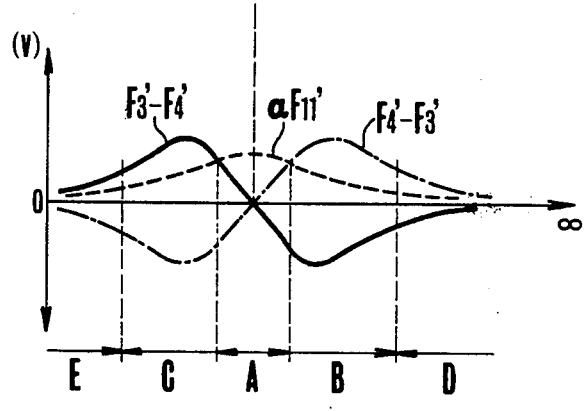

In the construction as described above, it is now assumed that the image forming lens 85 is adjusted relative to an object spaced at a finite distance therefrom. The manner of variation of the outputs F'3, F'11 and F'4 of the sample-hold circuits 92a, 92b and 92c and the corresponding variation of the output $\alpha$F'11 of the variable resistor 99 and the outputs F'3–F'4 and F'4–F'3 of the differential amplifiers 93 and 94 are shown in FIGS. 8A and 8B (FIG. 8A corresponds to FIG. 2A). When the image forming lens 85 falls within the region indicated by A in FIG. 8A, namely, under in-focus condition, $\alpha$F'11≧F'3–F'4, $\alpha$F'11≧(F'4–F'3) and F'11>V't and consequently the outputs of the comparators 95, 96 and 101 are high. Accordingly, only the output of the AND gate 104 is high, so that only the LED 107 is turned on, thereby displaying that the lens is under in-focus condition. When the lens falls within the region B, $\alpha$F'11>F'3–F'4, $\alpha$F'11<F'4–F'3 and F'11>V't and consequently the outputs of the comparators 95 and 101 are high while the output of the comparator 96 is low. Accordingly, only the output of the AND gate 103 is high, so that only the LED 106 is turned on, thereby displaying that the lens is under far-focus condition. When the lens falls within the region C, $\alpha$F'11<F'3–F'4, $\alpha$F'11≧F'4–F'3 and $F'11 > V't$ and consequently the outputs of the comparators 96 and 101 are high while the output of the comparator 95 is low. Accordingly, only the output of the AND gate 105 is high, so that only the LED 108 is turned on, thereby displaying that the lens is under near-focus condition. Referring to the regions D and E, it is assumed that V't is previously set so that $F'11 < V't$ when the lens falls within the region D or E. In such case, the output of the comparator 101 is low, so that all of the outputs of the AND gates 103, 104 and 105 are low, and consequently all LEDs 106, 107 and 108 are turned off, thereby showing that the lens is under extremely defocused condition. In such arrangement, it is possible to narrow the region A thereby providing the detection of in-focus condition with higher accuracy or to broaden the region A thereby providing the detection of in-focus condition at higher speed but with lower accuracy, only by adjusting the value of the above-mentioned factor $\alpha$.

Thus it will be understood that the system of the embodiment shown in FIG. 7 assures the distinction between in-focus, near-focus and far-focus conditions as well as distinction between true in-focus condition and extremely defocused condition, in the same manner as in the system shown in FIG. 3, and thus the disadvantage in the conventional system as described with reference to FIGS. 1A–1C is completely avoided.

Now, the description will be given to a modified form of the embodiment of FIG. 7, with reference to FIGS. 9A and 9B.

Figure 9A:
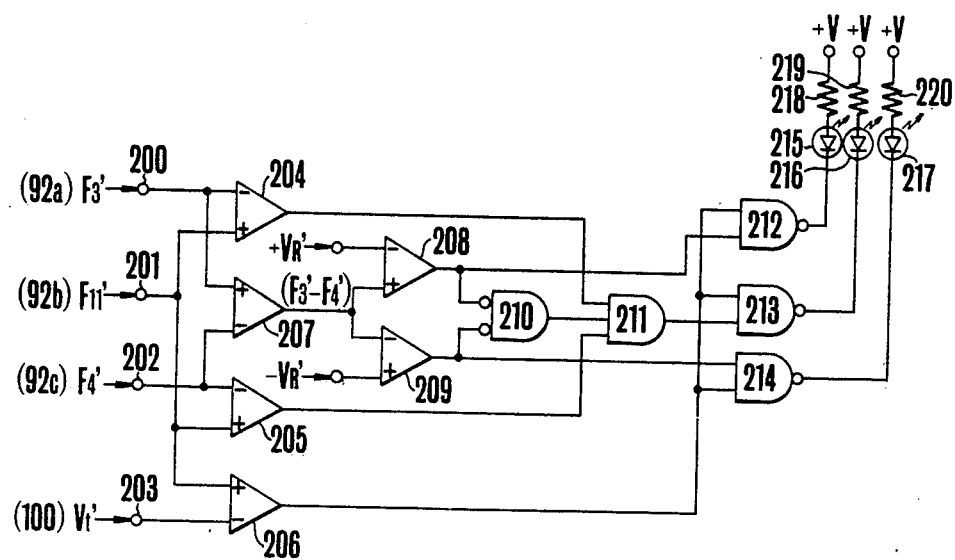
FIGS. 9A and 9B illustrate construction of an essential part, different from that shown in FIG. 7, in a modified form, and a principle of decision of the focus detecting condition.
Figure 9B:
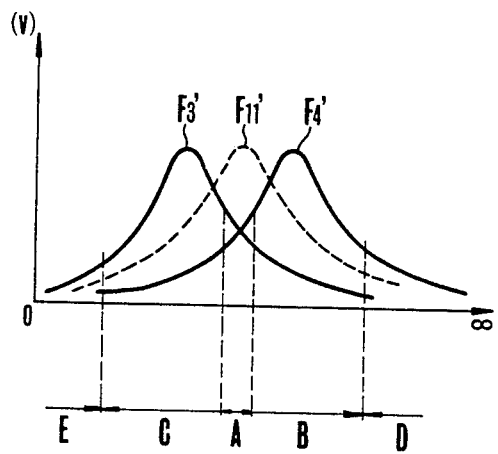

FIG. 9A shows the construction of a principal part different from that shown in FIG. 7. This modified form includes a terminal 200 to which the output F'3 of the sample-hold circuit 92a shown in FIG. 7 is fed, a terminal 201 to which the output F'11 of the sample-hold circuit 92b is fed, a terminal 202 to which the output F'4 of the sample-hold circuit 92c is fed, and a terminal 203 to which the predetermined voltage V't set by the variable resistor 100 is fed. A comparator 204 is arranged to compare F'3 and F'11, and the output of said comparator is low when $F'3 > F'11$, while it is high when $F'3 \leq F'11$. A comparator 205 is arranged to compare F'4 and F'11, and the output thereof is low when $F'4 > F'11$, while it is high when $F'4 \leq F'11$. A comparator 206 is arranged to compare F'11 and V't, and the output thereof is high when $F'11 \geq V't$, while it is low when $F'11 < V't$. A differential amplifier 207 is arranged to obtain (F'3−F'4), and a pair of comparators 208 and 209 which constitute window comparators are arranged to compare said (F'3−F'4) with the predetermined voltages V'R and −V'R. The outputs of these comparators are low when $-V'R \leq (F'3-F'4) \leq V'R$, and the output of the comparator 209 is low and the output of the comparator 208 is high when $(F'3-F'4) > V'R$, while the output of the comparator 208 is low and the output of the comparator 209 is high when $(F'3-F'4) < -V'R$. The circuit includes an AND gate 210 which is so connected that its output is high only when both outputs of the comparators 208 and 209 are low, an AND gate 211 which is so connected that its output is high only when the outputs of said AND gate 210 and the comparators 204 and 205 are high, a NAND gate 212 which is so connected that its output is low only when the outputs of the comparators 206 and 208 are high, a NAND gate 213 which is so connected that its output is low only when both outputs of the AND gate 211 and the comparator 206 are high, a NAND gate 214 which is so connected that its output is low only when both outputs of the comparators 206 and 209 are high, and displaying LEDs 215, 216 and 217 which are connected with the output ends of the NAND gates 212, 213 and 214, respectively, to which the voltage +V are applied through resistors 218, 219 and 220, respectively, so that one of the LEDs is turned on when the output of the corresponding NAND gate becomes low.

Now, the description will be given to the operation of this modified form, with reference to FIG. 9B. Firstly it is assumed that the region A of FIG. 9B is previously set under the conditions $F'11 \geq F'3$, $F'11 \geq F'4$, $F'11 \geq V't$ and $-V'R \leq (F'3-F'4) \leq V'R$. When the image forming lens 85 falls within the region A, the outputs of the comparators 204, 205 and 206 are high while the outputs of the comparators 208 and 209 are low, so that all outputs of the AND gates 210 and 211 and the NAND gates 212 and 214 are high while only the output of the NAND gate 213 is low, whereby only the LED 216 is turned on, thereby displaying the in-focus condition. Referring to the region B, it is assumed that it is set under the conditions $F'11 \leq V't$ and $(F'3-F'4) < -V'R$. In the case of this region B, the outputs of the comparators 206 and 209 are high while the output of the comparator 208 is low, so that the outputs of the AND gates 210 and 211 are low while the outputs of the NAND gates 213 and 214 are high. Accordingly, the output of the NAND gate 214 is low, whereby only the LED 217 is turned on, thereby displaying the far-focus condition. Referring to the region C, it is assumed that it is set under the conditions $F'11 \geq V't$ and $(F'3-F'4) > V'R$. In such case, the outputs of the comparators 206 and 208 are low and the output of the comparator 209 is low, so that the outputs of the AND gates 210 and 211 are low while the outputs of the NAND gates 213 and 214 are high. Accordingly, the output of the NAND gate 212 is low, whereby only the LED 215 is turned on, thereby displaying the near-focus condition. Referring to each of the regions D and E, it is assumed that it is set under the condition $F'11 < V't$. Then, the output of the comparator 206 is low in these regions D and E, and consequently the outputs of the NAND gates 212, 213 and 214 are high, whereby all of the LEDs 215, 216 and 217 are turned off, thereby showing the extremely defocused condition.

Accordingly, the system according to the modified form shown in FIG. 9A also assures the distinction between the in-focus, near-focus and far-focus conditions, as well as the distinction between the correct in-focus condition and the extremely defocused condition, with the result that the disadvantage in the conventional system is completely avoided.

Now the description will be given to an example of the construction of a single-lens reflex camera, in which the focus detecting system according to the present invention is included.

Referring to FIG. 10, the camera includes a camera body 110, a lens mount portion 111, and a photographing lens assembly 109 mounted on the camera body 110 at said mount portion 111. A view finder mirror 112 has a semi-transparent property of a suitable transmission factor, wholly or partly at the portion 112', and said mirror 112 is supported on a well-known supporting member 113 which is pivotally supported around an axis 113a. The supporting member 113 has an opening at the portion 113' thereof, which allows the passage of the light flux which has passed through the portion 112' of the mirror 112. An auxiliary mirror 114 is arranged to deflect the light flux, which has passed through said opening 113', in downward direction, that is, toward the bottom of the mirror box, and it is supported on a supporting member 115 which is pivotally mounted around an axis 115a. The mirror 112 and the auxiliary mirror 114 are so constructed that when a release button (not shown) is actuated to effect exposure operation, these mirrors are retracted from the photographing optical path prior to the start of the exposure, in accordance with the operation of said releasing button. A light receiving unit 116 including a beam splitter and a light receiving element which are housed in a single casing, such as shown in FIG. 5, for example, is arranged on the bottom of the camera body 110 so that it receives a light beam coming from the auxiliary mirror 114 through an opening 110'a of a frame 110' which forms the mirror box. An electric circuit unit 117 including a circuit such as shown in FIG. 3 or FIG. 7 (including a modified form shown in FIG. 9A) for detecting focusing condition of the photographing lens 109' on the basis of the output signals coming from the light receiving unit 116 is disposed on the bottom of the camera body 110. These units 116 and 117 can be integrated into one body, as already described. The camera includes a well-known shutter 118, a film 119, a pentagonal dach prism 120, a focusing plate 121 and, and eyepiece 122. An indicator 123 is arranged below said pengatonal dach prism 121, which allows display of focusing condition of the photographic lens 109' within the viewing field of the finder. The indicator 123 is controlled by the output of the electrical circuit unit 117.

Figure 11:
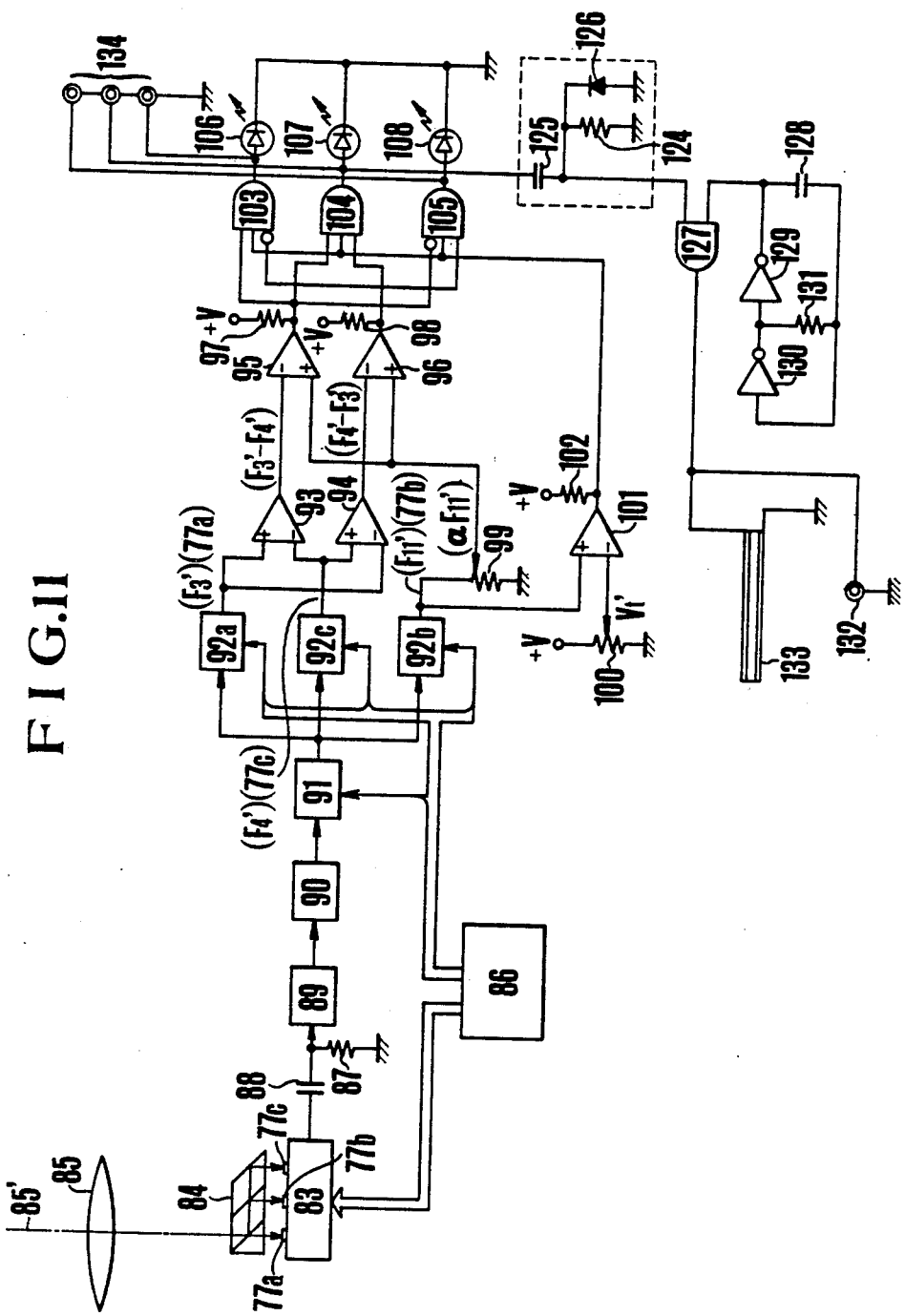
FIG. 11 is a circuit diagram shown another modified form of the embodiment shown in FIG. 7.

FIG. 11 shows a modified form of the embodiment such as shown in FIG. 7 in which the indication of the focusing condition can be effected by means of acoustic output and the output signal indicating the focusing condition can be fed outward. In FIG. 11, the parts indicated by the same symbols as used in FIG. 7 are identical with those already explained with reference to FIG. 7, and therefore the detailed explanation thereof is omitted. Referring to FIG. 11, the circuit includes a resistor 124 and a capacitor 125 which constitute a differentiating circuit for differentiating the output of the AND gate 104; a diode 126 for suppressing output of negative pulse signal coming from said differentiating circuit at the time when the output of the AND gate 104 changes from high to low state; a capacitor 128, inverters 129, 130 and a resistor 131 which constitute an oscillating circuit for feeding square wave pulses having a predetermined frequency; an AND gate 127 connected to allow the passage of the output pulses of said oscillating circuit for a period corresponding to pulse width only when positive pulse signals are fed from said differentiating circuit; and a sound generating member 133 (which may be sound generating body made of high polymer or piezoelectric buzzer or the like) connected to the output end of said AND gate 127. In such construction, when the output of the AND gate 104 is high and the LED 107 is turned on, the output pulse from the oscillating circuit (128, 129, 130 and 131) is fed through the AND gate 127 to the sound generating member 133, during the period corresponding to the width of the positive pulse fed from the differentiating circuit (124, 125) in accordance with the rise of the output of said AND gate from low to high state, whereby said member 133 generates sound during such period, thereby displaying the in-focus condition by means of turn-on of the LED 107 together with generation of sound of said member 133. In such case, the period of sound generation of the sound generating member 133 depends upon the positive pulse output level fed from the differentiating circuit (124, 125) relative to the input threshold of the AND gate 127, namely, the pulse width. In other words, said period depends upon the time constant of the resistor 124 and the capacitor 125 which constitute the differentiating circuit.

Accordingly, such period can be adjusted, as desired, by adjustment of the time constant. The main reason why such differentiating circuit (124, 125) and diode 126 are additionally connected in the circuit of this embodiment resides in the fact that when the system according to this embodiment is assembled in a camera, if the sound generating member 133 continues generation of sound under the in-focus condition of the photographing lens, the user of the camera may feel uncomfortable, and in order to avoid such disadvantage such additional connection is included. If it is necessary to take care of such circumstances, the circuit portion indicated by broken line in FIG. 11 which includes the resistor 124, the capacitor 125 and the diode 126 may be omitted and the output of the AND gate 104 may be directly applied to the AND gate 127.

The circuit shown in FIG. 11 further includes a connector 132 for outward connection of the output of the AND gate 127 and a plurality of connectors 134 for outward connection of the outputs of the AND gates 103, 104 and 105.

Figure 12:
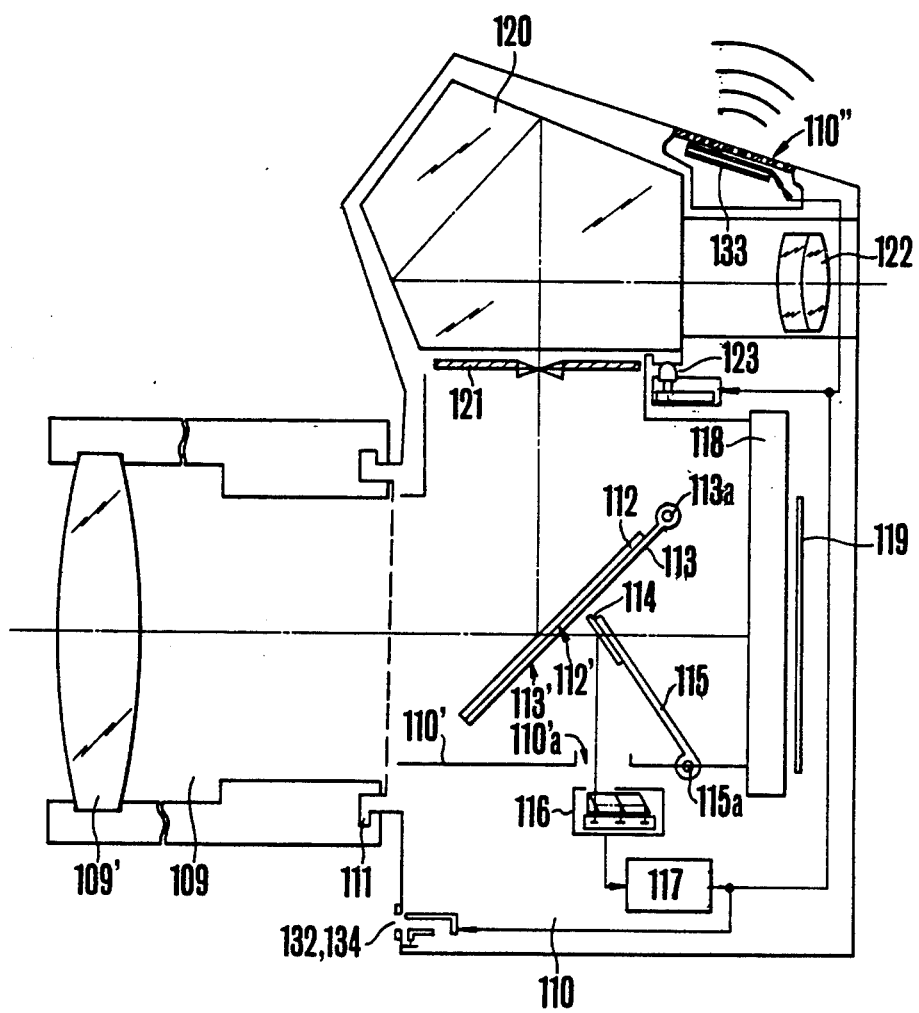
FIG. 12 is a schematic view illustrating an example of construction of a single-lens reflex camera in which the modified form shown in FIG. 11 is included.

Lastly, FIG. 12 shows an example of a single-lens reflex camera in which the system according to the embodiment shown in FIG. 11 is included, in the same manner as shown in FIG. 10. In this construction, a sound generating member 133 is arranged in opposite relationship to a sound issuing opening 110'' formed in a part of a housing portion of a camera body 110 which surrounds a pentagonal dach prism 120, for example, and connectors 132 and 134 for outward connection are arranged below a lens mount 111, for example, of the camera body 110. In the other points, the camera of FIG. 12 includes same construction as that shown in FIG. 10.

In the above explanation concerning the preferred embodiments of the present invention, the description has been given only with respect to the case where the output of the focus detection is utilized to produce display. However, it is a matter of course that the focus detecting system according to the present invention is not limited to such form of embodiment but it can be practically applied in satisfactory manner to the construction where a servo mechanism including a lens driving motor, for example, is included to effect automatic focus adjustment, with advantages as hereinbefore described. Referring to the construction of the light receiving means, the description has been given to the embodiment wherein three photo-sensitive elements or light receiving parts optically corresponding to the three positions including two positions on front and rear sides of the predetermined focal plane and one position corresponding to said predetermined focal plane are prepared, and signals corresponding to the focusing conditions at these three positions are produced. The present invention, however, can be embodied in the construction such as disclosed in the Sakane et al pending U.S. application Ser. No. 98,514 entitled "FOCUS DETECTING SYSTEM", in which a single photo-sensitive element or light receiving part is prepared and the length of optical path of light flux incident thereto is varied in proper manner so that signals substantially corresponding to the focusing conditions at the above-mentioned three positions can be selectively produced.

What is claimed is:

1. A focus detecting system for detecting focusing state of an image forming optical system relative to an object, said optical system having a predetermined focal plane, and said focus detecting system comprising:
   (A) means for detecting imaging states of an object image formed by said optical system at first and second positions optically equivalent to before and behind said focal plane of the optical system and at a third position optically equivament to said focal plane, said detecting means producing first, second and third signals corresponding to the imaging states of the object image at said first, second and third positions, respectively; and
   (B) means for deciding the focusing state of said optical system relative to the object on the basis of said first, second and third signals produced by said detecting means, said deciding means being arranged to form a fourth signal on the basis of said first and second signals and to decide the focusing state by using the fourth signal together with said third signal.

2. A focus detecting system according to claim 1, wherein said detecting means produces said first, second and third signals in the form of signals which vary in accordance with the sharpness of the object image at said first, second and third positions, respectively.

3. A focus detecting system according to claim 2, wherein said detecting means includes:
   first, second and third image receiving elements responsible to the variation of image sharpness, said first, second and third elements being arranged, substantially at said first, second and third positions, respectively, to receive the object image formed by said optical system, each of said image receiving elements producing an electrical output corresponding to the sharpness of the received image; and
   circuit means connected with said first, second and third image receiving elements to receive the outputs of said image receiving elements and to produce said first, second and third signals in accordance with the respective outputs;
   said deciding means being connected with said circuit means.

4. A focus detecting system according to claim 3, wherein said first, second and third image receiving elements are supported by a common base plate.

5. A focus detecting system according to claim 4, further comprising:
   optical means for causing said first, second and third image receiving elements to receive the object image formed by said optical system substantially at said first, second and third positions, respectively.

6. A focus detecting system according to claim 5, wherein said base plate for supporting said first, second and third image receiving elements and said optical means are constructed into one unit.

7. A focus detecting system according to claim 6, wherein said unit further includes said circuit means.

8. A focus detecting system according to claim 7, wherein said unit further includes said deciding means.

9. A focus detecting system according to claim 2, wherein said detecting means includes:
   image scanning means arranged to scan the object image formed by said optical system substantially at said first, second and third positions, said scanning means producing first, second and third scanning outputs corresponding to said object image at said first, second and third positions, respectively; and
   circuit means connected with said scanning means to receive said first, second and third scanning outputs of said scanning means and to produce said first, second and third signals in accordance with the respective scanning outputs;
   said deciding means being connected with said circuit means.

10. A focus detecting system according to claim 9, wherein said image scanning means includes:
    first, second and third image scanning portions arranged to scan the object image formed by said optical system substantially at said first, second and third positions to produce said first, second and third scanning outputs.

11. A focus detecting system according to claim 10, wherein said first, second and third image scanning portions are supported by a common base plate.

12. A focus detecting system according to claim 10 or 11, wherein said image scanning means is a semiconductor device of charge-coupled type.

13. A focus detecting system according to claim 10 or 11, wherein said image scanning means is a semiconductor device of MOS type.

14. A focus detecting system according to claim 12, wherein said image scanning means is so constructed that said first, second and third scanning outputs obtained by said first, second and third image scanning portions can be sequentially produced through a common output portion;
    said circuit means being connected to said output portion.

15. A focus detecting system according to claim 13, wherein said image scanning means is so constructed that said first, second and third scanning outputs obtained by said first, second and third image scanning portions can be sequentially produced through a common output portion;
    said circuit means being connected to said output portion.

16. A focus detecting system according to claim 10 or 11, wherein said image scanning means is so constructed that said first, second and third scanning outputs obtained by said first, second and third image scanning portions can be sequentially produced through a common output portion;
    said circuit means being connected to said output portion.

17. A focus detecting system according to claim 10 or 11, further comprising:
    optical means for causing said first, second and third image scanning portions of said image scanning means to receive the object image formed by said optical system substantially at said first, second and third positions, respectively.

18. A focus detecting system according to claim 17, wherein said image scanning means and said optical means are constructed into one unit.

19. A focus detecting system according to claim 18, wherein said unit further includes said circuit means.

20. A focus detecting system according to claim 19, wherein said unit further includes said deciding means.

21. A focus detecting system according to claim 1, 2, 3, 9 or 10, wherein said deciding means is arranged to decide that said optical system is in an extremely defocused state relative to the object when $f_3 \leq fc_1$ or $f_3 < fc_1$, where $f_3$ represents said third signal and $fc_1$ represents a predetermined value.

22. A focus detecting system according to claim 1, wherein said deciding means is arranged to decide that said optical system is in an in-focus state relative to the object when at least the conditions $|f_1-f_2| \leq fc_2$ or $|f_1-f_2| < fc_2$ and $f_3 > fc_1$ or $f_3 \geq fc_1$ are fulfilled, where $f_1$ and $f_2$ represent said first and second signals, respectively, and $fc_2$ represents a predetermined standard value.

23. A focus detecting system according to claim 1, wherein said deciding means is arranged to decide that said optical system is in an in-focus state relative to the object when at least the conditions $|f_1-f_2| \leq fc_2$ or $|f_1-f_2| < fc_2$, $f_3 > fc_1$ or $f_3 \geq fc_1$, $f_3 \geq f_1$ or $f_3 > f_1$, and $f_3 \geq f_2$ or $f_3 > f_2$ are fulfilled, where $f_1$ and $f_2$ represent said first and second signals, respectively, and $fc_2$ represens a predetermined standard value.

24. A focus detecting system according to claim 23, wherein said deciding means is arranged to decide that said optical system is in a near-focus state relative to the object when $f_1-f_2 > fc_2$ or $f_1-f_2 \geq fc_2$ and $f_3 > fc_1$ or $f_3 \geq fc_1$, and to decide that said optical system is in a far-focus state relative to the object when $f_1-f_2 \leq -fc_2$ or $f_1-f_2 \leq -fc_2$ and $f_3 > fc_1$ or $f_3 \geq fc_1$.

25. A focus detecting system according to claim 2, wherein said deciding means is arranged to decide that said optical system is in an in-focus state relative to the object when at least the conditions $|f_1-f_2| \leq kf_3$ or $|f_1-f_2| < kf_3$ and $f_3 > fc_1$ or $f_3 \geq fc_1$ are fulfilled, where $f_1$ and $f_2$ represent said first and second signals, respectively, and k represents a predetermined number smaller than 1.

26. A focus detecting system according to claim 25, wherein said deciding means is arranged to decide that said optical system is in a near-focus state relative to the object when $f_1-f_2 > kf_3$ or $f_1-f_2 \geq kf_3$ and $f_3 > fc_1$ or $f_3 \geq fc_1$, and to decide that said optical system is in a far-focus state relative to the object when $f_1-f_2 \leq -kf_3$ or $f_1-f_2 \leq -kf_3$ and $f_3 > fc_1$ or $f_3 \geq fc_1$.

27. A focus detecting system according to claim 24, wherein said deciding means includes indicating means for separately indicating said in-focus, near-focus, far-focus and extremely defocused states.

28. A focus detecting system according to claim 26, wherein said deciding means includes indicating means for indicating said in-focus, near-focus, far-focus and extremely defocused states.

29. A focus detecting system according to claim 22, wherein said deciding means is arranged to decide that said optical system is in a near-focus state relative to the object when $f_1-f_2 > fc_2$ or $f_1-f_2 \geq fc_2$ and $f_3 > fc_1$ or $f_3 \geq fc_1$, and to decide that said optical system is in a far-focus state relative to the object when $f_1-f_2 \leq -fc_2$ or $f_1-f_2 \leq -fc_2$ and $f_3 > fc_1$ or $f_3 \geq fc_1$.

30. A focus detecting system according to claim 29, wherein said deciding means includes indicating means for separately indicating said in-focus, near-focus, far-focus and extremely defocused states.

31. A focus detecting system according to claim 21, wherein said deciding means is arranged to form a difference signal between said first and second signals as said fourth signal.

32. A focus detecting system according to claim 31, wherein said deciding means is arranged to detect whether the third signal is larger than the first and second signals in order to decide whether the optical system is in an in-focus state.

33. A focus detecting system according to claim 1, 2, 3, 9 or 10, wherein said deciding means is arranged to form a difference signal between said first and second signals as said fourth signal.

34. A focus detecting system according to claim 33, wherein said deciding means is arranged to detect whether the third signal is larger than the first and second signals in order to decide whether the optical system is in an in-focus state.

35. A focus detecting system according to claim 34, wherein said deciding means is arranged to detect whether the third signal is larger than a predetermined value in order to decide whether the optical system is in an in-focus state.

36. A focus detecting system according to claim 33, wherein said deciding means is arranged to detect whether the third signal is larger than a predetermined value in order to decide whether the optical system is in an in-focus state.

37. A focus detecting system according to claim 1, 2, 3, 9 or 10, wherein said deciding means is arranged to detect whether the third signal is larger than the first and second signals in order to decide whether the optical system is in an in-focus state.

38. A focus detecting system according to claim 37, wherein said deciding means is arranged to detect whether the third signal is larger than a predetermined value in order to decide whether the optical system is in an in-focus state.

39. A focus detecting system according to claim 1, 2, 3, 9 or 10, wherein said deciding means is arranged to detect whether the third signal is larger than a predetermined value in order to decide whether the optical system is in an in-focus state.

40. A focus detecting system for detecting focusing state of an image forming optical system relative to an object, said optical system having a predetermined focal plane, and said focus detecting system comprising:
(a) means for detecting imaging states of an object image formed by said optical system at first and second positions optically equivalent to before and behind said focal plane of the optical system and at a third position different from said first and second positions, said detecting means producing first, second and third signals corresponding to the imaging states of the object image at said first, second and third positions, respectively; and
(b) means for deciding the focusing state of said optical system relative to the object on the basis of said first, second and third signals produced by said detecting means, said detecting means being arranged to form a fourth signal on the basis of the first and second signals and to decide the focusing state by using the first, second, third and fourth signals.

41. A focus detecting system according to claim 40, wherein said deciding means is arranged to form a difference signal between said first and second signals as said fourth signal.

42. A focus detecting system according to claim 40 or 41, wherein said third position is a position optically equivalent to said focal plane.

43. A focus detecting system according to claim 42, wherein said deciding means is arranged to detect whether the third signal is larger than the first and second signals in order to decide whether the optical system is in an in-focus state.

44. A focus detecting system according to claim 43, wherein said deciding means is arranged to detect whether the third signal is larger than a predetermined value in order to decide whether the optical system is in an in-focus state.

45. A focus detecting system according to claim 42, wherein said deciding means is arranged to detect whether the third signal is larger than the first and second signals in order to decide whether the optical system is in an in-focus state.

46. A focus indication system for indicating the focusing state of a lens means relative to an object, comprising:
   (a) focus discriminating means for discriminating focusing state of the lens means relative to the object among at least in-focus, near-focus and far-focus states and for producing an output indicative of each state;
   (b) visual indication means for visually indicating each of said focus states discriminated by said focus discriminating means; and
   (c) aural indication means for aurally indicating only the in-focus state.

47. A focus indication system according to claim 46, wherein said visual indication means includes three light emitting elements each for indicating one of said focus states.

48. A focus indication system according to claim 46 or 47, further comprising control means coupled to said aural indication means to control the aural indication means to operate for a predetermined period of time.

49. A single lens reflex camera body for use with a photo taking lens attachable thereto, comprising:
   (a) a housing having a lens mount portion for mounting thereon said lens;
   (b) focus discriminating means disposed within said housing for discriminating focusing state of the lens relative to an object among at least in-focus, near-focus and far-focus states and producing an output indicative of each state;
   (c) visual indication means disposed within said housing for visually indicating each of said focus states discriminated by said focus discriminating means;
   (d) aural indication means disposed within said focusing for aurally indicating only the in-focus state; and
   (e) terminal means for conducting said output of said focus discriminating means out of the housing.

50. A single lens reflex camera body according to claim 49, further comprising:
   a view finder;
   and wherein said visual indication means is so disposed in the housing that the indication state of the visual indication means can be observed through said view finder.

51. A single lens reflex camera body according to claim 50, wherein said visual indication means includes three light emitting elements each for indicating one of said focus states.

52. A single lens reflex camera body according to claim 49, 50 or 51, wherein said terminal means is disposed in the vicinity of said lens mount portion.

53. A single lens reflex camera body according to claim 49, 50 or 51, further comprising control means coupled to said aural indication means to control the aural indication means to operate for a predetermined period of time.

54. A sensor module comprising:
   (a) radiation sensing means having a plurality of radiation sensitive portions formed on a same plane;
   (b) a beam divider for dividing an incident radiation beam into a plurality of radiation beams and for causing each of the divided radiation beam to impinge upon one of said radiation sensitive portions of the sensing means, said beam divider having a portion for conducting therein said incident beam and portions for conducting out said divided beams;
   (c) a radiation shield having an opening aligned with said conduct-in portion of the beam divider for allowing therethrough the entering of said incident beam into the beam divider at the conduct-in portion; and
   (d) package means for supporting said sensing means, beam divider and radiation shield.

55. A sensor module according to claim 54, further comprising terminal means electrically connected with said sensing means and supported by said package means.

56. A sensor module according to claim 54 or 55, wherein said sensing means is a silicon semiconductor device.

57. A sensor module according to claim 56, wherein said sensing means is of MOS type.

58. A sensor module according to claim 56, wherein said sensing means is of CCD type.

59. A single lens reflex camera body for use with a photo taking lens attachable thereto, comprising:
   (a) a housing having a lens mount portion for mounting thereon said lens;
   (b) means for defining a film plate;
   (c) a sensor module for focus detection, said module including:
      (1) radiation sensing means having a plurality of radiation sensitive portions formed on a same plane;
      (2) a beam divider for dividing an incident radiation beam into a plurality of radiation beams and for causing each of the divided radiation beam to impinge upon one of said radiation sensitive portions of the sensing means, said beam divider having a portion for conducting therein said incident beam and portions for conducting out said divided beams;
      (3) a radiation shield having an opening aligned with said conduct-in portion of the beam divider for allowing therethrough the entering of said incident beam into the beam divider at the conduct-in portion; and
      (4) package means for supporting said sensing means, said beam divider and said radiation shield;
   said sensor module being so disposed in the housing that first and second ones of said plurality of sensitive portions are respectively located at positions optically equivalent to before and behind said film plane; and
   (d) circuit means disposed within the housing for receiving electrical signals from said sensor module and for detecting focusing state of the lens on the basis of the received signals.

60. A single lens reflex camera body according to claim 59, further comprising indication means for indicating the focusing state of the lens detected by said circuit means.

61. A single lens reflex camera body according to claim 60, wherein said indication means includes visual indication means for visually indicating the focusing state of the lens.

62. A single lens reflex camera body according to claim 60 or 61, wherein said indication means includes aural indication means for aurally indicating the focusing state of the lens.

63. A single lens reflex camera body according to claim 59 or 60, further comprising terminal means for conducting an output of said circuit means out of the housing.

64. A single lens reflex camera body according to claim 63, wherein said terminal means is disposed in the vicinity of said lens mount portion.

* * * * *